United States Patent [19]

Bayha et al.

[11] Patent Number: 4,525,427
[45] Date of Patent: Jun. 25, 1985

[54] POLYESTER PRIMER COMPOSITION AND METHOD

[75] Inventors: Charles E. Bayha, Collierville, Tenn.; Daniel H. McQueen, Holly Springs, Miss.

[73] Assignee: The Alpha Corporation, Collierville, Tenn.

[21] Appl. No.: 659,867

[22] Filed: Oct. 12, 1984

Related U.S. Application Data

[63] Continuation of Ser. No. 420,101, Sep. 20, 1982, abandoned, which is a continuation-in-part of Ser. No. 379,887, May 19, 1982, abandoned.

[51] Int. Cl.$^3$ .............................................. B32B 15/08
[52] U.S. Cl. .................................... 428/458; 427/140; 427/142; 427/388.1; 427/393.5; 428/480; 523/500; 528/298
[58] Field of Search ...................... 427/140, 142, 388.1, 427/393.5, 385.5; 428/458, 480; 523/500; 528/298

[56] References Cited

U.S. PATENT DOCUMENTS

| | | | |
|---|---|---|---|
| 2,671,070 | 3/1954 | Knapp | 528/298 |
| 3,333,022 | 7/1967 | Reiners et al. | 528/298 |
| 3,347,806 | 10/1967 | Zimmermann | 528/298 |
| 3,448,066 | 6/1969 | Parker | 528/298 |
| 4,246,367 | 1/1981 | Curtis | 528/298 |
| 4,309,519 | 1/1982 | Obara et al. | 528/298 |
| 4,360,634 | 11/1982 | Nelson | 528/298 |
| 4,363,907 | 12/1982 | Hefner et al. | 528/298 |

FOREIGN PATENT DOCUMENTS

| | | | |
|---|---|---|---|
| 3017694 | 11/1981 | Fed. Rep. of Germany | 528/298 |
| WO81/03305 | 11/1981 | PCT Int'l Appl. | 427/140 |
| 1016077 | 9/1962 | United Kingdom | 528/298 |

*Primary Examiner*—S. L. Childs
*Attorney, Agent, or Firm*—Lyon & Lyon

[57] ABSTRACT

Polyester compositions containing dicyclopentadiene, maleic acid and a compound containing at least one alcoholic hydroxy group, the polyester formed by a two-stage process. In the first stage, maleic acid and dicyclopentadiene are heated to form an intermediate reaction product. In the second stage, the intermediate is heated with a compound containing at least one alcoholic hydroxy group to form the polyester. The compositions containing this polyester and a diluent have good adhesion to metal and plastic substrates, and are useful as automobile body putty primers. These polyester compositions exhibit good adhesion in corrosion-inducing environments, and are useful to protect against further corrosion.

13 Claims, No Drawings

POLYESTER PRIMER COMPOSITION AND METHOD

This is a continuation of application Ser. No. 420,101, filed Sept. 20, 1982, and now abandoned, which is a continuation-in-part of application Ser. No. 379,887, filed May 19, 1982, and now abandoned, both of which are incorporated herein by reference.

FIELD OF THE INVENTION

The invention relates to polyester compositions capable of forming thin films and adhering to metal and plastic substrates. The polyesters used in these compositions are formed from dicyclopentadiene, maleic acid or maleic anhydride and a compound containing at least two alcoholic hydroxy groups. These polyester compositions exhibit good adhesion to metal substrates such as steel, as well as plastic and fiberglass substrates, and provide smooth coatings which are easily sanded, and are particularly useful in repairing automobile bodies. Such compositions are typically called body putty primers.

BACKGROUND OF THE INVENTION

Plastic materials have replaced metallic solders in most automobile body repairs involving dents and gouges of automobile body surfaces. One reason for the popularity of plastic materials in this field is that the application of plastic materials is easier, and requires less skill than does the use of metallic solders. Another reason for the popularity of plastic materials for body repair, is the fact that the use of such plastic materials requires no heating of the metallic substrates. Heating of the metallic substrate, which is necessary in the use of metallic solders, tends to cause heat distortion of the substrate. This problem is avoided by the use of plastic materials.

SUMMARY OF THE INVENTION

The polyesters used in compositions in accordance with the present invention are formed from dicyclopentadiene, maleic acid or maleic anhydride, and a compound containing at least two alcoholic hydroxyl groups. These polyester compositions can be applied to metal surfaces, such as iron or steel surfaces, or plastic or fiberglass surfaces in the form of a coating or as a putty.

DETAILED DESCRIPTION OF THE INVENTION

In order to maximize the longevity of automobile body repairs, surface preparation is generally necessary. Usually displaced metal on the automobile body surface, such as dents and gouges, are mechanically returned to their original, proper position before filling. In addition, the metal surface may be cleaned and optionally etched. Cleaning the metal surface may involve washing the surfaces with a detergent and then with a petroleum based solvent. If rust is present, an acidic solution such as vinegar or phosphoric acid may also be applied to remove rust. The metallic surfaces may then be sanded. The metal surface may also be chemically etched to maximize adhesion of surfacing materials to the metal surface. Holes in the metal surface may be covered with plastic bridges (patches). If a plastic bridge is applied, additional sanding may be necessary.

After such pretreatment, one or more layers of body putty primer, according to the invention, is applied to seal the surface of the repair. The body putty primer, according to the invention, is preferably sanded to provide a smooth coating. Thereafter one or more layers of plastic filler (body putty) are applied to fill the dent and/or gouge. A paint primer is then applied to the surface of the repair. Glaze, a thin bodied surfacing compound, may be applied to fill minor surface imperfections. Advantageously, a second layer of paint primer may then be applied. Thereafter, a final coat of paint is applied to the repaired surface.

The polyesters used in compositions in accordance with the present invention are formed from dicyclopentadiene, maleic acid or maleic anhydride, and a compound containing at least two alcoholic hydroxyl groups. These compositions, when applied to metal, plastic or fiberglass surfaces, form a smooth film which may be readily sanded. Metal surfaces coated with the body putty primer of the present invention also exhibit excellent corrosion resistance, even after exposure to salt water.

Compositions, according to the present invention, contain in addition to a polyester, diluents which may be solvents for the polyester. In addition, the compositions may contain fillers, pigments, thixotropic enhancers, and other conventional additives. Diluents for the polyester may be present in amounts from about 10% to about 50% by weight, based on the weight of the total composition. Generally the diluent may be an unsubstituted or substituted alkane, straight chain or branched containing up to about 10 carbon atoms; unsubstituted or substituted aryls; ketones of up to about 10 carbon atoms; acetates of up to about 10 carbon atoms; or admixtures thereof. When an alkyl or aryl is substituted, it may contain one or more nitro, hydroxy, amino, or chloro groups. Preferred diluents include toluene, "Nipar S-30" which includes 1,2-dinitropropane, admixed with a polar aromatic solvent; "VETB-66", a low flash aliphatic solvent, admixed with aromatic solvents; "Troluoil", another low flash point aliphatic solvent (flash point 25° F., K.G. 38.5); ketones such as methyl ethyl ketone, methyl isobutyl ketone, and acetone; acetates such as isobutyl acetate and butyl acetate; and admixtures thereof.

Examples of suitable diluent mixtures include (all percentages by weight, based on the weight of the total mixture):

17% toluene
15% Nipar S-30
15% Troluoil
22% methyl ethyl ketone, and
31% isobutyl acetate Other diluent mixtures which may be used include typical paint solvents, well known to those skilled in the paint art. Typical paint solvents include various turpentine components, cyclohexane, xylene, toluene, acetone, and acetates such as butyl acetate.

Polyester compositions according to the present invention may be applied by spraying the composition on the substrate. The composition sprayed must be catalyzed, either by mixing a catalyst into the composition prior to spraying or at the spray gun head. The catalyst is typically a peroxide, such as methyl ethyl ketone peroxide, dissolved in a solvent such as diallyl phthalate. Usually about 1 to 3% by weight, compared to the weight of the composition of peroxide catalyst containing about 9% active oxygen is used. Typical commercial available peroxide catalysts include Norax-brand "MEK 9" and RC1-brand "Suerox 709". Other means of applying the catalyzed polyester compositions according to the present invention to the substrate include rollers, reverse roller coaters, brushes, or trowels, depending on the viscosity of the polyester composition.

The polyesters used in the compositions of the present invention are produced in a two-stage process. In the first stage, the preparation of an intermediate or adduct which is a reaction product containing dicyclopentadiene and maleic acid or maleic anhydride is undertaken. During the second stage, polymer formation, molecular weight buildup and esterification are effected. Both stages of the process are undertaken under inert conditions. The term "inert conditions" refers to the absence of oxygen. Practically, inert conditions may be obtained by flushing the reaction system with nitrogen, either alone or admixed with carbon dioxide.

During the first stage of the polyester manufacturing process, maleic acid or maleic anhydride is reacted with dicyclopentadiene to produce an intermediate containing dicyclopentadiene and maleic moieties. The product of the first stage may be considered an intermediate, which may contain dicyclopentadiene moieties in the backbone of said intermediate. In the experiments reported below, the maleic acid was generated in situ. In these experiments, the maleic acid was generated by hydrolytic conversion of maleic anhydride to maleic acid, by reacting substantially equimolar amounts of maleic anhydride and water at temperatures ranging from about 60° to about 80° C. Because of the physical properties of maleic anhydride and maleic acid, the hydrolic conversion of maleic anhydride to maleic acid is preferably undertaken in the presence of a heat transfer agent. The heat transfer agent is preferably a glycol, such as one which may be used in esterification in the second stage of the process. Other heat transfer agents which may be used include dicyclopentadiene, or even a solvent such as toluene.

The maleic acid is reacted with dicyclopentadiene at elevated temperatures, discussed below, optionally in the presence of a catalyst under the previously described inert conditions. No catalyst is necessary if the dicyclopentadiene is present during maleic acid production. The molar ratio of maleic acid to dicyclopentadiene may range from 0.5 to 4.0. It is noted that the molar ratio of these reactants controls their content in the polyester product. Thus if the molar ratio of the reactants is about 1:1, the polyester product will contain dicyclopentadiene and maleic acid units in a ratio of about 1:1.

The elevated temperatures of the reaction mixture are high enough to obtain the intermediate, but low enough to avoid cracking dicyclopentadiene, and to avoid isomerization of maleic acid to fumaric acid. Thus the reaction mixture is substantially free of fumaric acid throughout the first stage of the process. The reaction mixture is also substantially free of cyclopentadiene throughout the first stage of the process. At ambient pressure, under which all experiments have been undertaken, it has been found that at temperatures of about 130° C. or greater, fumaric acid is produced, and that at temperatures of 140° C. or greater, dicyclopentadiene is cracked into two moles of cyclopentadiene. With regard to minimum temperatures, it has been found that at temperatures of about 90° C. or less, yields of the intermediate are reduced. Accordingly, in producing polyesters used in the compositions of the present invention, in the first stage of the process, the reaction mixture containing dicyclopentadiene and maleic acid should be heated to temperatures from about 100° to about 120° C.

Because of the temperature requirements of the second stage of the process, the intermediate produced in the first stage of the process should contain less than about 2% unreacted dicyclopentadiene, based on composition weight. In the second stage of the process, the elevated temperature conditions could result in the cracking of remaining dicyclopentadiene. It is intended to maximize the dicyclopentadiene content of the polyesters used in the compositions of the present invention. It is therefore desirable to minimize unwanted production of cyclopentadiene, by reducing the amount of unreacted dicyclopentadiene in the intermediate to less than about 2%. In this manner, cracking of dicyclopentadiene in the second stage of the process is substantially eliminated.

Accordingly, in an embodiment of the invention, the time for reaction in the first stage of the process to produce polyester used in the compositions of the present invention is controlled to insure that only less than about 2% dicyclopentadiene remains in the reaction mixture. The time period for reaction in the first stage of the process will vary, depending on whether the reaction between dicyclopentadiene and maleic acid is undertaken in the presence of absence of a catalyst. In the absence of a catalyst, the reaction between dicyclopentadiene and maleic acid, to reduce the amount of dicyclopentadiene to less than about 2%, will occur in a time period ranging from about 4 to about 8 hours.

In the presence of a catalyst, the time period for the reaction of the first stage is reduced, and the amount of dicyclopentadiene consumed is increased, compared to the comparable reaction undertaken without a catalyst. Thus, in the presence of a catalyst, the reaction time may be reduced to less than 2 hours, and the dicyclopentadiene remaining in the reaction mixture may be reduced to less than about 0.5%.

The catalysts which may be used in the first stage of the process include boric acid/oxalic acid, methane sulfonic acid, boron trifluoride etherate, p-toluene sulfonic acid, arsenic pentoxide, potassium bisulfate, phosphorus pentaoxide, ascorbic acid/benzoic acid, stannous octoate, zinc chloride, stannous chloride, manganese acetate, zinc acetate, "Filtrol Grade 1" by Filtrol Corporation, "Fascat 4100" or "Fascat 4201" from M & T Corporation, and "Tyzor TE" or "Tyzor AA" or "Tyzor OG" organic titanates from E. I. duPont. The preferred catalyst comprises boric acid and oxalic acid in an admixture of 500/500 ppm based on the solids.

The first stage reaction between maleic acid and dicyclopentadiene under the foregoing conditions will produce an intermediate product or adduct which contains dicyclopentadiene and maleic acid, and which contains at least one free carboxylic acid group. Polymerization and esterification of the intermediate under the conditions described below produces the polyesters used in the compositions of the present invention.

In addition to maleic acid, additional acids may optionally be used to form the polyesters used in the compositions of the present invention. Examples of additional acids which may be used to form the polyesters include adipic acid, phthalic acid, isophthalic acid, terephthalic acid, methyl ester derivatives of these acids, and mixtures thereof.

After the first stage reaction has been completed, so that the reaction mixture contains less than about 2% unreacted dicyclopentadiene, the second stage of the two-stage process occurs. During the second stage of the polyester manufacturing process polymerization and polyesterification of the first stage immediate is undertaken in the presence of a compound containing at least one alcoholic hydroxy group. Preferably the polymerization and polyesterification of the first stage intermediate is undertaken in the presence of a compound containing at least two alcoholic hydroxy groups, such as a glycol or a polyol containing three or more hydroxy groups. Alcoholic hydroxy group-containing compounds useful in the second stage of the polyester manufacturing process may be any of those conventionally employed in the production of polyesters, such as neopentyl glycol or trimethyl propane diol, cyclohexane dimethanol, dipropylene glycol, tripropylene glycol, tetradipropylene glycol, triethylene glycol, tetraethylene glycol, hexanediol, butanediol, and other straight chain diols, propylene glycol, diethylene glycol, and mixtures thereof.

Preferred alcoholic hydroxy group-containing compounds are propylene glycol, and diethylene glycol. Polyesters formed from propylene glycol form extremely stable emulsions. Diethylene glycol may be used in polyesters of low molecular weight ranging from about 1500 to about 2000, of excellent wet out capacity, and of excellent flexibility. The molar amount of, for example, the glycol which is used in the second stage is about equal to:

$$(\text{moles of maleic acid}) - \frac{(\text{moles of dicyclopentadiene})}{2}$$

This molar amount of glycol used in the second stage includes any glycol which may have been used as a heat transfer agent in the hydrolic conversion of maleic anhydride to maleic acid in the first stage of the process to produce polyester used in the compositions of the present invention.

The temperature of the polymerization and polyesterification in the second stage can range from about 190° C. to about 230° C. Preferably the temperature in the second stage is about 200° C. Heating in the second stage is continued until the reaction mixture exhibits a Gardner Holt viscosity of at least about D, 60/40 cnt (Methacel solvent). Practically, the reaction mixture is heated at about 190° C. to about 230° C. for a period of time ranging from about 6 hours to about 8 hours. The polyesters produced under these conditions are characterized by molecular weights of about 1200 to about 3000, and by acid numbers of less than about 30. The polymers produced exhibit Gardner Holt viscosities ranging from D to T, at 60/40 cnt (Methacel solvent). Diethylene glycol is used to produce polyesters of greater flexibility and lower molecular weight and viscosity. Generally, polyesters for body putty primer produced from diethylene glycol will have molecular weights from about 1500 to about 2000. Diethylene glycol is the preferred glycol used in the present invention, because of the greater flexibility of the coatings made from such body putty primer.

The dicyclopentadiene content of the polyesters produced by the present process ranges from about 25% to about 50% by weight. When it is indicated that the polyesters used in the compositions of the present invention contain dicyclopentadiene, such reference is meant to encompass both the dicyclopentadiene moiety itself, and also the moiety corresponding to the intermediate produced in the first stage of the process, and also to monomers, dimers, trimers, tetramers, etc., of the dicyclopentadiene moiety and of said maleic acid adduct of dicyclopentadiene.

The examples below illustrate body putty primer compositions according to the present invention, and polyesters used therein.

EXAMPLE 1

A composition for use in a body putty primer. The composition includes:

| Component | Amount (Wt. %) |
| --- | --- |
| Polyester (of Method 5 below) | 70.9% |
| Solvent Mixture | 26.3% |
| Triton X100 | 0.15% |
| Hydroxylated Starch or Sugar | 0.10% |
| Activated Silica | 0.54% |
| Hydroquinone | 0.018% |
| Cobalt Naphthenate | 0.92% |
| Copper Naphthenate | 0.068% |
| TOTAL | 100% |

The solvent mixture used in the above example is a mixture of 17% toluene, 15% Troluoil, 15% Nipar S-30, 23% methyl ethyl ketone and 31% isobutyl acetate. Triton X100 (by Rohm & Haas) is a quaternary benzyl trimethyl ammonium chloride. Hydroxylated starch or sugar is used as a thix enhancer. A preferred hydroxylated starch is EA-84 by N.L. Industries. A preferred activated silica is Cabosil by Cabot. Copper naphthenate is obtained from Mooney Chemical.

The Triton X100 is first dissolved in the polyester, and the EA-84 thix enhancer is dissolved in hot styrene. Activated silica is dispersed in a cowles dissolver. Lastly, the solvent system described above is added. The formulation is then milled with a combination of filler and pigment, so that the mixture contains 39.3% (compared to the total weight of the composition) of:

| Component | Amount (Wt. %) |
| --- | --- |
| $CaCO_3$ | 8.9% |
| Talc | 27.28% |
| $TiO_2$ | 3.12% |

The viscosity of the polyester and solvent mixture is about 2 at 2 rpm 4200 cps, and 2 at 20 rpm 680 cps. In comparison, the viscosity of the filled system is 2 at 2 rpm, 10,000-11,300 cps, and 2 at 20 rpm, 1,500 to 1,700 cps.

Metal coated with the above cured composition exhibits excellent corrosion resistance, even after exposure to salt water for 500 hours.

Polyesters used in the compositions of the present invention are made by the following methods. Method 5 is the preferred method for producing polyesters used in the compositions of the present invention.

METHOD 1

Two moles of maleic anhydride (196 gms) were charged into a kettle and heated to 70°-80° C. under an inert gas blanket. The kettle was equipped with mechanical stirrer, a vigreux column, and a thermometer. Attached to the column was a water condenser and a claison head with thermometer to monitor head temperature. A jacketed water-cooled receiver was connected to the claison head. Inert gas was monitored by a flow meter and could be introduced into the mixture by either sparge or blanket.

Two moles of water (36 gms) and 0.5 moles of ethylene glycol (31 gms) were slowly added to the kettle, while the kettle temperature was maintained at 90°–100° C. with cooling. At this point, a cook inhibitor may be added and can be selected from the following compounds: hydroquinone, mono-tert.-butyl hydroquinone, toluhydroquinone, tert-butyl catechol, di-tert-butyl-hydroquinone, p-benzoquinone, hydroquinone, mono-methyl ether, 1,4-naphthoquinone, Cyanox 1790 (American Cyanamid) 2,4-di-tert-butyl cresol, and Irganox 1010 (Ciba-Geigy). The preferred inhibitor systems are hydroquinone or m-tert butyl hydroquinone and p-benzoquinone in amounts ranging from about 50–500 ppm based on solids weight. Generally, it is preferred to employ three inhibitors to maintain dicyclopentadiene stability because of its tendency to air-cure. These include the cook catalyst inhibitor, a thinning inhibitor, and a storage inhibitor. A preferred combination includes hydroquinone (a cook catalyst inhibitor), mono-tertiarybutylhydroquinone (a thinning inhibitor), and benzoquinone, phenylquinone or quinone (storage inhibitors).

After addition of inhibitor, 2 moles of dicyclopentadiene (260 gms) were slowly added to the kettle which was maintained at temperatures of 90°–100° C. Four different sources of dicyclopentadiene were used: from Exxon Corporation, from Dow Chemical Company, from Chemical Exchange Corporation, and from Shell Chemical.

Purity of the dicyclopentadiene varied from 55–90%. Effective mole weight was estimated by the percent active ingredients in the mixture. Exxon dicyclopentadiene is 100% reactive and therefore the actual and effective mole weight is 132. The other sources vary from 94–97% reactive and the weight of these which is equivalent to one mole of pure and 100% reactive dicyclopentadiene varies from 136.1 to 140.8. Thus, 140.4 gms of a source of dicyclopentadiene which is only 94% reactive, compared to pure dicyclopentadiene, will be required to provide one effective mole of dicyclopentadiene.

After all of the dicyclopentadiene was added over a period of 40 to 60 minutes, the reaction mixture was maintained at 100° C. for one-half hour. The temperature of the reaction mixture was then increased to 120° C. and maintained at 120° C. for two hours.

Analysis of the first stage reaction product by gas chromatography revealed the following composition:
a. unreacted maleic anhydride: 18–22%
b. dicyclopentadiene (unreacted): 2–3%
c. maleic anhydride/dicyclopentadiene adduct: 65–70%
d. high molecular weight products: 5–10%

When dicyclopentadiene from Exxon or Dow is employed, it is preferable to add the cook inhibitor(s) at this point. The cook catalyst(s) can be added at this point to increase the amount of dicyclopentadiene consumed and to shorten cycle time of cook. The preferred catalyst system is boric acid/oxalic acid at 500/500 ppm based on solids.

Propylene glycol (0.5 moles, 45.6 gms) was then added to the reaction vessel. The reaction mass was heated to 200°–220° C., during which time distillate was removed. All of the water initially charged is removed, plus 2–2.5% by total solids wt. extra water. Loss of unreacted dicyclopentadiene (DCPD) with catalyst is 2–4% (by weight of DCPD charged); loss without catalyst, 5–7%. The reaction was allowed to continue until the acid number was less than 30 and Gardner Holt viscosity at 60% solids and 40% methocel solvent was E-F. At this point, the mixture was cooled to 160°–170° C. and thinned in 30% by weight styrene stabilized with 100 ppm mono-tert-butyl hydroquinone.

METHOD 2

Two moles of maleic anhydride (196 gms) were charged into a kettle similarly equipped as in METHOD 1. It was heated to 70°–80° C. Dicyclopentadiene (Dow Chemical) (2 moles; 94% active–280.8 gms) was charged into the kettle which was heated to maintain a temperature at 70°–80° C.

Water (2.25 moles or 40.5 gms) was slowly added at a temperature between 80°–100° C., maintained by cooling. After all the water was added, the whole was heated at 100°–110° C. for half an hour. It was then heated to 120° C. and held for two hours. Analysis (gas chromatograph) indicated the following mixture:
a. unreacted maleic anhydride: 12–18%
b. unreacted dicyclopentadiene: 0.5%
c. dicyclopentadiene/maleic acid adduct: 73.80%
d. higher molecular weights: 2–5%

Hydroquinone (100 ppm based on solids charge), as an inhibitor, was added at this time. No cook catalyst was added.

Propylene glycol (0.5 moles, 45.6 gms) and ethylene glycol (0.5 moles, 31.0 gms) were also added at the same time as the hydroquinone.

The reaction mixture was heated at 200°14 220° C. until the acid number was less than 30 and Gardner Holt viscosity at 60% solids and 40% methocel was E-F. The reaction mixture was cooled and thinned as in METHOD 1.

METHOD 3

Two moles of maleic anhydride (196 gms) were charged into a kettle similarly equipped as in METHOD 1. It was heated to 70°–80° C. Dicyclopentadiene (1.0 mole; 94% active–140.4 gms) from Dow Chemical was added at a temperature maintained at 70°–80° C. with heating.

Water (1.60 moles or 28.8 gms) was slowly added at a temperature of between 80°–100° C. maintained by cooling. After all the water was added, the mixture was heated to 100°–110° C. and held at that temperature for one-half hour. It was then heated to 120° C. and held at the elevated temperature for two hours. Gas chromatography indicated less than 0.1% free dicyclopentadiene.

Hydroquinone (100 ppm based on solids charge), was added as an inhibitor at this time. No cook catalyst was added. Propylene glycol (1.6 moles, 121.6 gms) was also added.

This mixture was heated at 200°–220° C. until the acid number was less than 30 and Gardner Holt viscosity at 60% solids and 40% methocel was E-F. The reaction mixture was cooled and thinned as in METHOD 1.

METHOD 4

Two moles of maleic anhydride, 196 gms, were charged into a kettle similarly equipped as in METHOD 1. It was heated to 70°–80° C.

Water (1.60 moles–28.8 gms) was then slowly added to the maleic reactant which was then maintained at temperatures of between 80°–100° C. with cooling. After all the water was added, the mixture was heated to 100° C.

Dicyclopentadiene (1.0 moles, 94% active-140.4 gms) from Dow Chemical Company was slowly added to the mixture which was maintained at a temperature below 100° C. After a hold period at 100° C. for half an hour, the mass was heated to 120° C. and maintained at 120° C. for two hours. Gas chromatography analysis indicated 0.5% free dicyclopentadiene. Hydroquinone (100 ppm based on solids charge), was added as an inhibitor at this time. No cook catalyst was added. Propylene glycol (1.6 moles, 121.6 gms) was added. The final resin was prepared in the same manner as in METHOD 3.

METHOD 5

Two moles of maleic anhydride (196 gms) were charged into a kettle similarly equipped as in METHOD 1. The kettle was heated to 70°-80° C.

Water (1.60 moles 28.8 gms) was slowly added while maintaining a temperature between 80°-100° C. with cooling. After all the water was added, the kettle was heated to 100° C.

Dicyclopentadiene from Dow Chemical Co. (1.0 moles, 94% active, 140.4 gms) was slowly added at a temperature maintained below 100° C. After the addition was complete, the mass was held at 100° C. for half an hour. The temperature was then raised to 120° C. and maintained for two hours.

Hydroquinone (100 ppm based on solids charge), was added as an inhibitor at this time. No cook catalyst was added. Diethylene glycol (1.6 moles or 169.6 gms) was added to the mass. The resin was prepared in a similar manner as in METHOD 3.

Resins prepared according to this method are of low viscosity and low molecular weight ranging from 1500 to 2000 and exhibit excellent glass filler wet-out properties.

METHOD 6

Two moles of maleic anhydride (196 gms) were charged into a kettle similarly equipped as in METHOD 1. The kettle was heated to 70°-80° C.

A mixture of water (2.00 moles, 36.0 gms) and diethylene glycol (0.25 moles, 26.5 gms) was slowly added while the temperature of the kettle contents was maintained below 100° C. with cooling.

Dicyclopentadiene from Dow Chemical Co. (2.00 moles; 94% active, 280.8 gms) was slowly added to the kettle at a temperature below 100° C. After half an hour hold period, the mass was heated to 120° C. and maintained for two hours. Gas chromatography analysis indicated 3% unreacted dicyclopentadiene.

Hydroquinone (100 ppm based on solids charge), was added to the cook. No cook catalyst was added.

Diethylene glycol (1.35 moles or 143.1 gms) was added to the cook.

The resin was prepared in a similar manner as with METHOD 3.

METHOD 7

Two moles of maleic anhydride, 196 gms, were charged into a kettle similarly equipped as in METHOD 1. The mixture was heated to 70°-80° C.

Water (1.60 moles, 28.8 gms) and diethylene glycol (0.25 moles, 26.5 gms) was slowly added to the molten maleic anhydride maintained at a temperature below 100° C. with cooling.

Dicyclopentadiene (1.00 mole, 94% active, 140.4 gms) was slowly added to the mixture at a temperature below 100° C. After half an hour, the temperature was raised to 120° C. and maintained at 120° C. for two hours. Gas chromatography indicated less than 1% free dicyclopentadiene.

Hydroquinone (100 ppm based on solids charged), was then added as an inhibitor.

Diethylene glycol, 0.75 moles (79.5 grams) was then added.

The whole was allowed to react in an inert gas atmosphere at 200°-220° C. until the acid number of the reaction mixture was less than 50. The reaction mixture was then placed on inert gas sparge and heated until Gardner Holt viscosity in 60% solids/40% methocel was G-H. The temperature was then decreased to 180°-190° C. and inert gas sparging continued. When the viscosity reached an R-S and an acid number less than 20, the mixture was cooled to 160° C. and thinned in 30% by weight styrene inhibited with 100 ppm mono-tert-butyl-hydroquinone.

METHOD 8

Two moles of maleic anhydride (196 gms) and 2 moles of dicyclopentadiene (2.00 moles, 94% active, 280.8 gms) were charged into a kettle similarly equipped as in METHOD 1. The kettle was heated to 70°-80° C.

Water (2.00 moles, 36.0 gms) and propylene glycol (0.5 moles, 38.8 gms) were slowly added at a temperature maintained below 100° C. After half an hour at 100°-110° C., the mixture was heated to 120° C. and maintained at 120° C. for two hours. Analysis by gas chromatography indicated less than 1% free dicyclopentadiene in the reaction mixture.

Inhibitor, hydroquinone (100 ppm based on solids charge), was added at this point.

Propylene glycol (0.6 moles, 45.6 gms) was added, and the mixture was heated at 200°-220° C.

Utilizing the same procedure as in METHOD 7, the cook was cooled and thinned in 100 ppm mono-tert-butyl-hydroquinone when the acid number decreased to below 20 and the viscosity (Gardner Holt) became R-S.

Resins produced by this method are very stable like those of METHOD 5 and exhibit higher molecular weights than those of METHOD 5. Resins produced by METHOD 8 are preferred for molding techniques.

It is understood that various other modifications will be apparent to and can readily be made by those skilled in the art without departing from the scope and spirit of this invention. Accordingly, it is not intended that the scope of the claims appended hereto be limited by the description above, but rather that the claims be construed as encompassing all the patentable features which reside in the present invention, including all features which would be treated as equivalents thereof by those skilled in the art to which this invention pertains.

What is claimed is:

1. A method for repairing a gouged or dented surface with a polyester containing dicyclopentadiene moieties in the polymer backbone formed by a two-stage process, the first stage comprising heating maleic acid and dicyclopentadiene together under inert conditions, to an elevated temperature which, under the conditions of the process, is less than both (1) the temperature at which maleic acid will isomerize to fumaric acid, and (2) the temperature at which dicyclopentadiene will crack to form cyclopentadiene, until an intermediate is formed, which intermediate is the reaction product of maleic acid and dicyclopentadiene and which intermediate contains maleic acid moieties and dicyclopentadiene moieties in a mole ratio which is about 1; and the second stage comprising heating said intermediate in the presence of a compound containing at least one alcoholic hydroxy group to temperatures up to 240° C. to produce said polymer, wherein the intermediate, as subjected to heating in the second stage, contains less than 2% unreacted dicyclopentadiene, comprising:

applying to said gouged or dented surface a primer composition comprising said polyester in a diluent, said polyester comprising about 50% to about 90% by weight of said composition, and said diluent comprising from about 10% to about 50% by weight of said composition.

2. The method of claim 1, wherein said hydroxyl compound contains at least two alcoholic hydroxy groups.

3. The method of claim 1, wherein said diluent also contains a filler, pigment or mixtures thereof.

4. The method of claim 1, wherein said surface is an automobile body surface.

5. The method of claim 1, wherein said surface is a steel surface.

6. The method of claim 1, wherein said surface is a plastic surface.

7. A primer composition for repairing a gouged or dented surface, comprising:

a polyester containing dicyclopentadiene moieties in the polymer backbone formed by a two-stage process, the first stage comprising heating maleic acid and dicyclopentadiene together under inert conditions, to an elevated temperature which, under the conditions of the process, is less than both (1) the temperature at which maleic acid will isomerize to fumaric acid, and (2) the temperature at which dicyclopentadiene will crack to form cyclopentadiene, until an intermediate is formed, which intermediate is the reaction product of maleic acid and dicyclopentadiene and which intermediate contains maleic acid moieties and dicyclopentadiene moieties in a mole ratio which is about 1; and the second stage comprising heating said intermediate in the presence of a compound containing at least one alcoholic hydroxy group to temperatures up to 240° C. to produce said polymer, wherein the intermediate, as subjected to heating in the second stage, contains less than 2% unreacted dicyclopentadiene, and a diluent, said polyester comprising about 50% to about 90% by weight of said composition, and said diluent comprising from about 10% to about 50% by weight of said composition.

8. The composition of claim 6, wherein said hydroxy compound contains at least two alcoholic hydroxy groups.

9. The composition of claim 6, wherein said diluent also contains a filler, pigment or mixtures thereof.

10. A dented or gouged surface, adhered to which is a primer composition comprising a polyester containing dicyclopentadiene moieties in the polymer backbone formed by a two-stage process, the first stage comprising heating maleic acid and dicyclopentadiene together under inert conditions, to an elevated temperature which, under the conditions of the process, is less than both (1) the temperature at which maleic acid will isomerize to fumaric acid, and (2) the temperature at which dicyclopentadiene will crack to form cyclopentadiene, until an interemdiate is formed, which intermediate is the reaction product of maleic acid and dicyclopentadiene and which intermediate contains maleic acid moieties and dicyclopentadiene moieties in a mole ratio which is about 1; and the second stage comprising heating said intermediate in the presence of a compound containing at least one alcoholic hydroxy group to temperatures up to 240° C. to produce said polymer, wherein the intermediate, as subjected to heating in the second stage, contains less than 2% unreacted dicyclopentadiene, and said polyester comprising about 90% to about 50% by weight of said composition and a diluent comprising from about 10% to about 50% by weight of said composition.

11. The primed surface of claim 10, wherein said surface is an automobile body surface.

12. The primed surface of claim 10, wherein said surface is a steel surface.

13. The primed surfaced of claim 10, wherein said surface is a plastic surface.

* * * * *